(12) United States Patent
Sonnendorfer et al.

(10) Patent No.: US 7,780,240 B2
(45) Date of Patent: Aug. 24, 2010

(54) RESTRAINT BELT FOR CHILDREN

(76) Inventors: Horst Sonnendorfer, Lindberghstr. 8, D-82178 Puchheim (DE); Franz Wieth, Lindberghstr. 8, D-82178 Puchheim (DE)

( * ) Notice: Subject to any disclaimer, the term of this patent is extended or adjusted under 35 U.S.C. 154(b) by 0 days.

(21) Appl. No.: 11/997,914

(22) PCT Filed: Jun. 20, 2006

(86) PCT No.: PCT/DE2006/001054
§ 371 (c)(1),
(2), (4) Date: Aug. 15, 2008

(87) PCT Pub. No.: WO2007/016887
PCT Pub. Date: Feb. 15, 2007

(65) Prior Publication Data
US 2008/0315663 A1 Dec. 25, 2008

(30) Foreign Application Priority Data
Aug. 5, 2005 (DE) .................. 20 2005 012 535 U
May 5, 2006 (DE) .................. 20 2006 007 319 U

(51) Int. Cl.
*B60R 22/00* (2006.01)
*B60R 22/30* (2006.01)
(52) U.S. Cl. ...................... 297/474; 297/479
(58) Field of Classification Search .............. 297/479, 297/476, 474; 280/807
See application file for complete search history.

(56) References Cited

U.S. PATENT DOCUMENTS

| | | | | | |
|---|---|---|---|---|---|
| 3,248,148 | A | * | 4/1966 | Board et al. | 297/476 X |
| 3,306,661 | A | * | 2/1967 | Allen | 297/474 X |
| 4,886,315 | A | * | 12/1989 | Johnson | 297/476 X |
| 5,551,447 | A | * | 9/1996 | Hoffman et al. | 128/869 X |

* cited by examiner

*Primary Examiner*—Anthony D Barfield
(74) *Attorney, Agent, or Firm*—Laurence A. Greenberg; Werner H. Stemer; Ralph E. Locher

(57) ABSTRACT

The belt can be pulled out of the housing against a spring force, and the length of the belt is fixed by inserting the belt buckle into the holder.

6 Claims, 2 Drawing Sheets

RESTRAINT BELT FOR CHILDREN

TECHNICAL FIELD

The invention relates to restraint belts for children on baby-strollers, child carrying seats, high chairs or shopping trolleys.

PRIOR ART

A very wide variety of embodiments of restraint belts of this type are known.

U.S. Pat. No. 5,263,726 shows a restraint belt which is guided around the child's stomach and between the child's legs, a solution which is not very ergonomic and is not very comfortable.

In addition, a disadvantage of this restraint belt is that the belt and the clasps of the belt may hang around loosely when not in use and may become caught in any parts into whose vicinity they come.

This may disadvantageously lead to limitations of the service value, and sometimes also to damage to the belt or the belt buckle.

In the case of belts which are attached to shopping trolleys, the belts which hang around loosely may also obstruct the movement of the basket flap and, as a result, also make the space-saving pushing of the shopping trolleys one inside another impossible.

U.S. Pat. No. 3,350,136 discloses a restraint belt which is fastened to the backrest of the child seat and is guided around the upper body of the child.

This restraint belt is wound up on a roller and is pulled out of a housing counter to the resistance of a spiral spring and, when not in use, the belt is pulled back again into the housing by the force of the spiral spring.

Although, in the case of this restraint belt, the risk of the loose belts becoming caught somewhere is reduced, the roller and the housing for the belt have an interfering volume which may also be obstructive when pushing the shopping trolleys one inside another.

A further disadvantage of the belt known from U.S. Pat. No. 3,350,136 is the fact that the belt, when it has been placed around the child, is not fixed in a properly fixed manner but rather is only held by the force of the spiral spring.

By this means, it is disadvantageously possible that a child in an unobserved moment may become free from the belt simply by pulling on the belt and may thus even endanger himself.

US 2004/0041457 discloses a restraint belt which is located in a space-saving manner in the handlebar of a shopping trolley and, when not in use, is pulled back again into the housing by a spring.

This prior art eliminates the disadvantage which exists in U.S. Pat. No. 3,350,136 of the bulky housing for the belt, but the disadvantage of the belt being tensioned only by the spring force and of the child being able to free himself by pulling on the belt remains.

DE 103 52 095 A1 discloses a spring-loaded restraint belt which is attached to the surface on which the child sits. The disadvantage of the child being able to free himself by pulling on the belt is also found in this restraint belt. A further disadvantage is that the restraint belt is integrated in a rigid plate and cannot be used for a collapsible baby-stroller.

DISCLOSURE OF THE INVENTION

Technical Object

It is the object of the invention to provide a restraint belt which ensures secure buckling up of a child by the belt length being able to be matched in a simple manner to the individual size of the child and the belt not being able to be loosened by the child.

A further object of the invention is to avoid damage to the belt and the belt closure. In the event of the restraint belt being used on a shopping trolley, it is also the object of the invention to avoid damage occurring by the unused belt becoming caught on parts of the shopping trolley concerned or of another shopping trolley.

A further object of the invention is to design the configuration of the entire restraint system in such a manner that it does not get in the way during collapsing of a baby-stroller, for example a "buggy".

In addition, the restraint belt arrangement is to be ergonomic and comfortable.

Technical Solution

These objects are achieved by a restraint system in which the belt and the belt closure attached to the free end of the belt are pulled in the rest state into a flat housing by a spring force and do not protrude beyond the contours of the housing in this state, wherein the belt can be pulled out of the housing counter to the spring force, and the belt is fixed by the belt closure latching in a receptacle such that it cannot be pulled further out of the housing.

In a development of the invention, it is provided that, after the belt closure is latched in the receptacle, the belt can no longer be pulled further out of the housing but continues to be pulled into the housing by the spring force. The result of this is that a belt which has initially been placed loosely around the child automatically always bears tautly against him.

In a development of the invention, the housing and the mechanism located in the housing are designed in such a manner that the housing and the mechanism located in the housing can be deformed.

Advantageous Effects

The effect advantageously achieved by the present invention is that the user automatically correctly sets the length of the belt and a child cannot adjust the length of the belt, in particular cannot loosen the belt in an unsupervised moment to an extent such that he can become free from the belt.

The flat deformable housing has the advantage that it is not bulky and does not get in the way in particular when stacking shopping trolleys one inside another or when collapsing a baby-stroller.

BRIEF DESCRIPTIONS OF THE DRAWINGS

The invention is described below with reference to two possible exemplary embodiments and by 4 figures.

In the figures, in detail:

Figure 1:
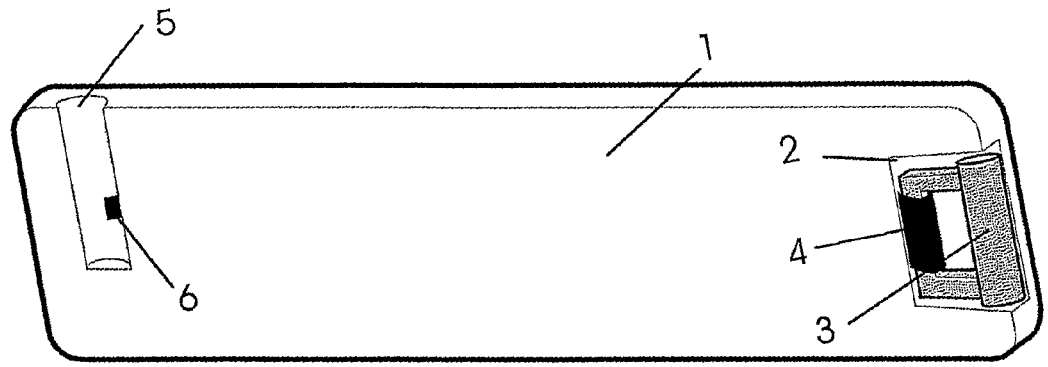
FIG. 1 shows, in a perspective illustration, the seat belt when not in use.

The housing 1 is of essentially flat design. It is approximately the same width as an average-sized child's back. The housing 1 has, on one side, a trough 2 in which the belt closure 3 is found. Only a small piece of the belt 4 can be seen, the rest of the belt 4 is within the housing 1.

On the other side lying opposite the trough 2, the housing 1 has a recess 5 into which the belt closure 3 can latch. An actuating element 6 which is connected to a mechanism accommodated in the interior of the housing can be seen in said receptacle 5.

Figure 2:
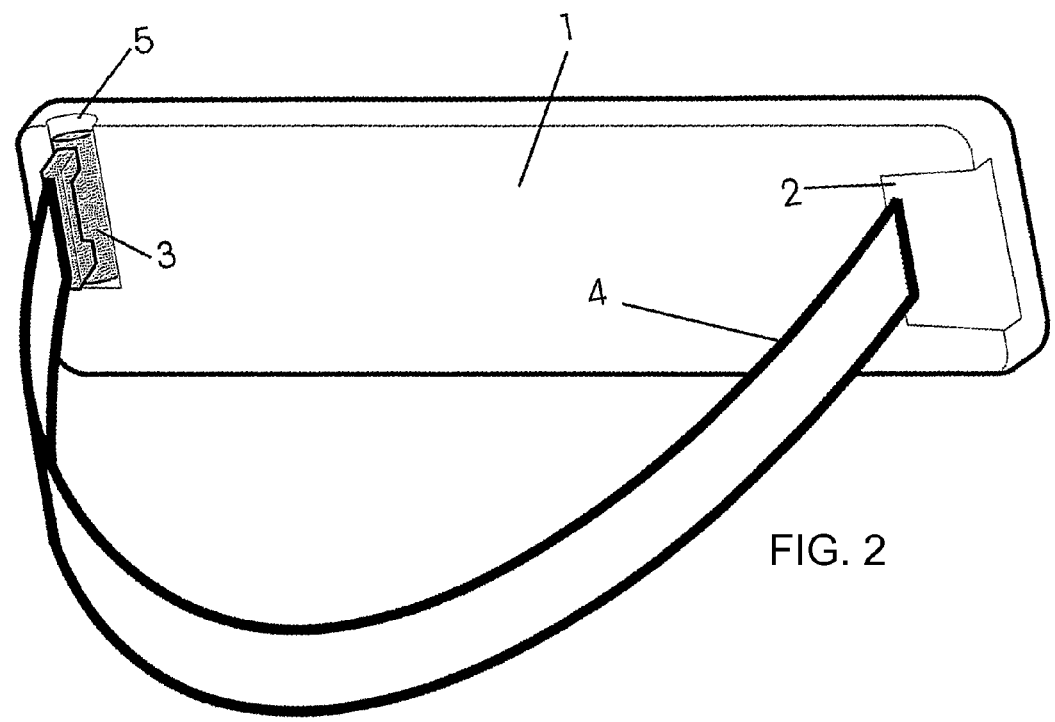
FIG. 2 shows, in a perspective illustration, the seat belt when in use.

FIG. 2 shows the belt 4 in the extended state. The belt closure 3 is inserted into the recess 5 and is latched therein. The latching of the belt closure 3 in the recess 5 has caused the actuating element 6 to move sideways and a blocking of the belt 4 takes place via the mechanism accommodated in the housing 1.

As long as the belt closure 3 is located in the recess 5, the actuating element 6 remains displaced sideways and the belt 4 is therefore also blocked.

Figure 3:
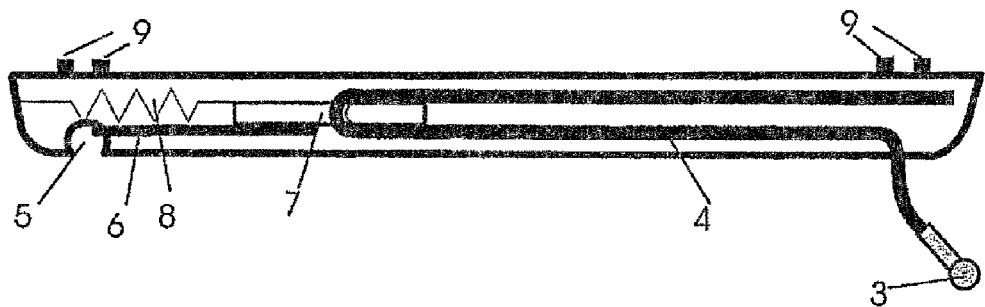
FIG. 3 shows the seat belt in a sectioned illustration.

FIG. 3 shows the interior of the housing 1 in a sectioned illustration. The belt 4 is pulled out somewhat. The belt 4 runs in a loop around a slide 7. It is thus possible to accommodate a sufficiently long belt 4 in the housing 1 and to design the housing 1 at the same time to be flat.

A tension spring 8 is fastened to the slide 7 and thereby pulls the belt 4 into the housing. When the belt 4 is pulled out, the spring 8 is tensioned.

If a particularly long belt 4 is to be accommodated in the housing 1, it is also possible to provide more than one deflection and more than one slide 7 in the housing 1, over which the belt 4 then runs in a meandering manner.

This makes it advantageously possible to dispense with a bulky roller for winding up the belt.

The housing 1 is overall of planar design in order to provide the child with a large contact surface, as a result of which unpleasant pressure points are avoided.

The housing 1 can be fastened to the child seat or shopping trolley by customary fastening means, for example screws or clamps.

Figure 4:
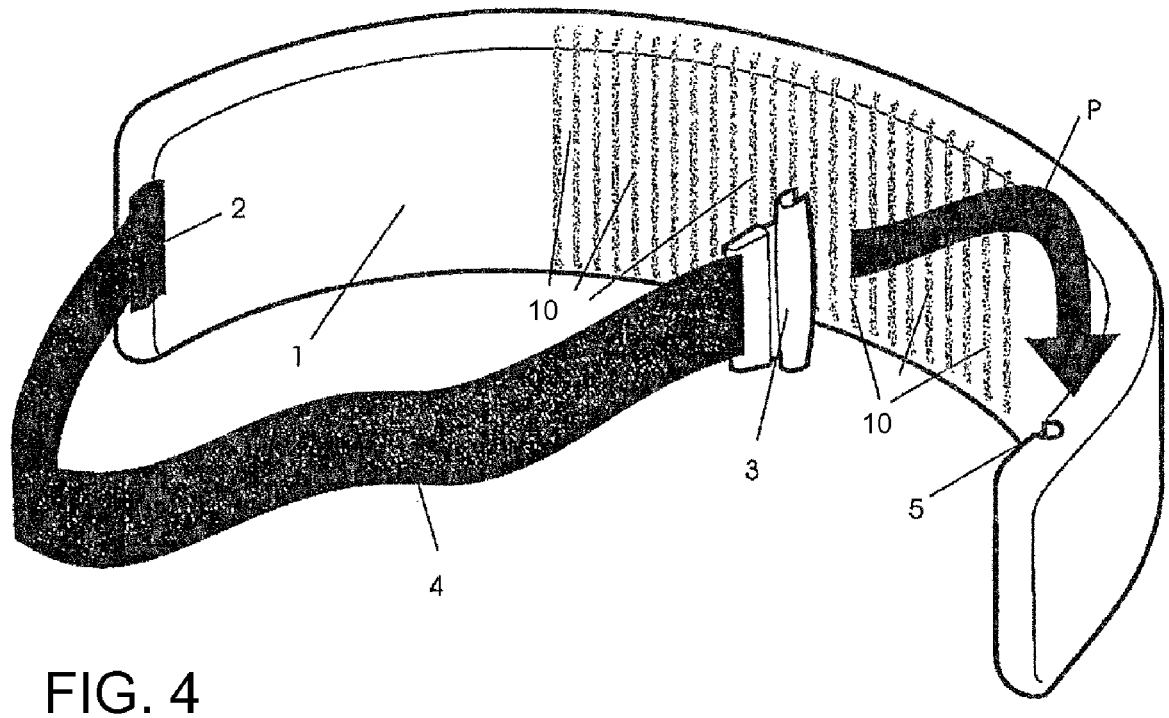
FIG. 4 shows a development of the invention with a flexible housing.

FIG. 4 shows a development of the invention in which the housing 1 and the mechanism accommodated in the housing 1 are of deformable design. This development makes it possible to use the invention even if a rigid structure is annoying, for example in the case of a collapsible baby-stroller, the "buggy".

In the illustration shown, the belt 4 is pulled out. The recess 5 into which the belt closure 3 can be inserted is located in the region of the opposite side of the housing 1.

The arrow P indicates how the belt closure 3 which is attached to the end of the belt 4 is to be pushed into the recess 5.

In this refinement of the invention, too, the blocking of the belt 4 takes place in the manner already described.

The housing 1 and the mechanism contained therein is of deformable design. In the example shown, this deformability is achieved by a rib-like region 10 of the housing 1.

In order to make the deformation possible, use may also be made of any other method customary for a person skilled in the art, for example by the use of joints and/or expanded gaps.

Embodiment(s) of the Invention

Depending on the application, the invention can be used in the above-described embodiments.

INDUSTRIAL APPLICABILITY

The invention is industrially applicable in the large product field of shopping trolleys, child seats, baby-strollers and collapsible baby-strollers.

The invention claimed is:

1. A restraint belt assembly for children, the assembly comprising:
   a housing having a recess formed therein;
   a slide disposed in the housing;
   a restraint belt looped about the slide in an interior of the housing, the restraint belt being capable of being pulled out of the housing, and the restraint belt having a belt closure;
   a spring fixed to the slide for pulling the restraint belt back into the housing when the belt is not in use; and
   an actuating element disposed at the recess, the belt closure engaging the actuating element when the closure is disposed in the recess such that the actuating element is moved sideways for blocking the restraint belt from being pulled further out of the housing.

2. The restraint belt assembly for children according to claim 1, wherein, when not in use, the belt and the belt closure do not protrude beyond contours of the housing.

3. The restraint belt assembly for children according to claim 1, wherein, after the belt closure is latched in the recess, the belt can be pulled back into the housing by the spring.

4. The restraint belt assembly for children according to claim 1, wherein the housing reversibly deformable.

5. The restraint belt assembly for children according to claim 1, wherein the slide is a plurality of slides and the belt runs over the slides in a meandering manner over a length of the housing.

6. The restraint belt assembly for children according to claim 1, further comprising a deflection element, the belt running over the slide and the deflection element in a meandering manner over a length of the housing.

* * * * *